(12) United States Patent
Riley

(10) Patent No.: US 11,021,394 B2
(45) Date of Patent: Jun. 1, 2021

(54) COATED FIBERS FOR ENHANCED CONCRETE STRUCTURAL REINFORCEMENT

(71) Applicant: Pascale Industries, Inc., Pine Bluff, AR (US)

(72) Inventor: Michael A. Riley, Jacobus, PA (US)

(73) Assignee: Pascale Industries, Inc., Pine Bluff, AR (US)

( * ) Notice: Subject to any disclaimer, the term of this patent is extended or adjusted under 35 U.S.C. 154(b) by 75 days.

(21) Appl. No.: 16/350,326

(22) Filed: Nov. 5, 2018

(65) Prior Publication Data

US 2019/0256418 A1     Aug. 22, 2019

Related U.S. Application Data

(60) Provisional application No. 62/707,544, filed on Nov. 7, 2017.

(51) Int. Cl.
| | |
|---|---|
| *C04B 20/00* | (2006.01) |
| *C04B 7/02* | (2006.01) |
| *C04B 20/10* | (2006.01) |
| *C04B 14/02* | (2006.01) |
| *C04B 14/04* | (2006.01) |
| *C04B 18/08* | (2006.01) |
| *C04B 111/00* | (2006.01) |

(52) U.S. Cl.
CPC ............. *C04B 20/006* (2013.01); *C04B 7/02* (2013.01); *C04B 14/026* (2013.01); *C04B 14/04* (2013.01); *C04B 18/08* (2013.01); *C04B 20/1033* (2013.01); *C04B 20/1037* (2013.01); *C04B 2111/00129* (2013.01)

(58) Field of Classification Search
CPC ......... C04B 7/02; C04B 14/026; C04B 14/04; C04B 18/08; C04B 20/006; C04B 20/1033; C04B 20/1037; C04B 2111/00129
See application file for complete search history.

(56) References Cited

U.S. PATENT DOCUMENTS

| | | | |
|---|---|---|---|
| 6,753,081 B1 | 6/2004 | Lovett et al. | |
| 7,168,232 B2 | 1/2007 | Lovett et al. | |
| 7,285,167 B2 | 10/2007 | Ogden | |
| 7,341,627 B2 | 3/2008 | Ogden | |
| 7,396,403 B1 | 7/2008 | Ogden | |
| 8,114,514 B1 | 2/2012 | MacDonald et al. | |
| 8,142,889 B2 | 3/2012 | MacDonald et al. | |
| 9,321,686 B2 | 4/2016 | Lovett et al. | |
| 10,369,754 B2 * | 8/2019 | Biland | B29C 70/10 |
| 2011/0262732 A1 | 10/2011 | Ogden | |
| 2014/0060392 A1 * | 3/2014 | Koenigstein | C04B 20/0068 106/802 |

* cited by examiner

*Primary Examiner* — Anthony J Green
(74) *Attorney, Agent, or Firm* — Michael de Angeli

(57) ABSTRACT

Fibers to be added to concrete to improve its properties are coated with an alkali-insoluble polymer, to provide adhesion of the fibers to the concrete. In a further improvement, nanoparticles are dispersed in an alkali-soluble polymer coating, and this is used to coat the fibers. When the fibers are mixed into the concrete mix, the nanoparticles are dispersed throughout the concrete, avoiding problems from agglomeration of the nanoparticles if simply added to the concrete mix.

11 Claims, 6 Drawing Sheets

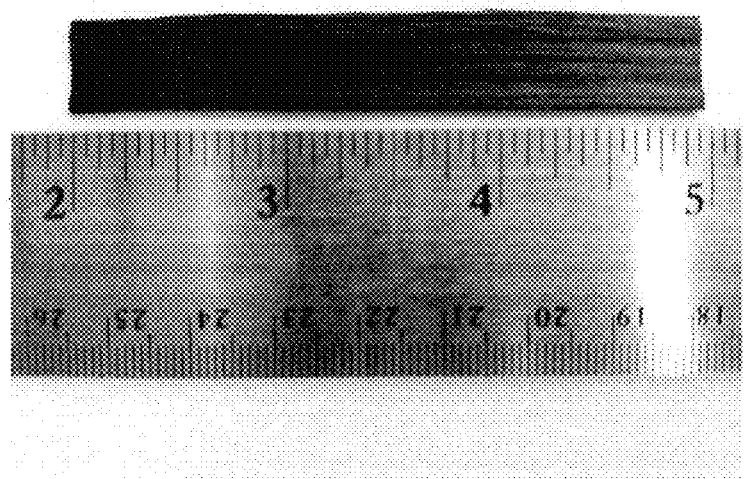
Fig. 1 Photograph of a carbon fiber produced under Ogden Patent showing a mechanically texturized surface.
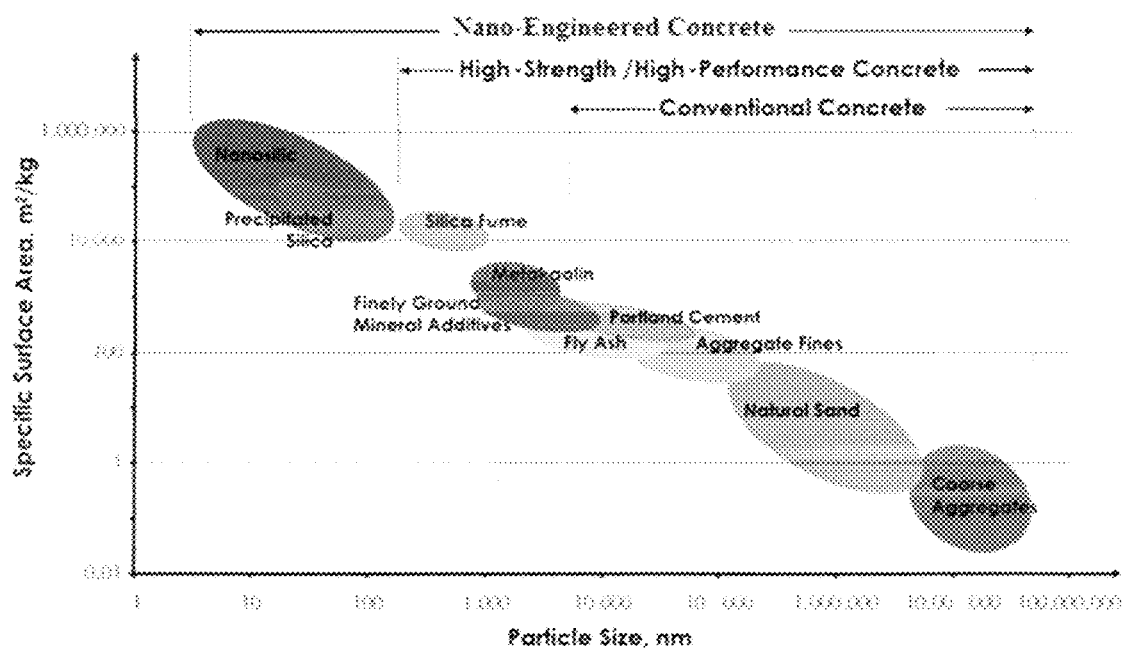
Figure 2. overview chart of nano-to-macro additives to concrete showing specific surface area and particle size Figure 3. Typical concrete reinforcement fibers
Fig. 3(a): Steel
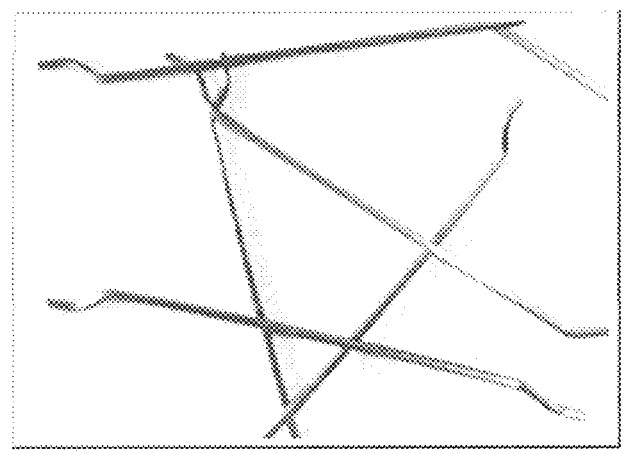
Fig. 3(b): Polypropylene micro-fiber
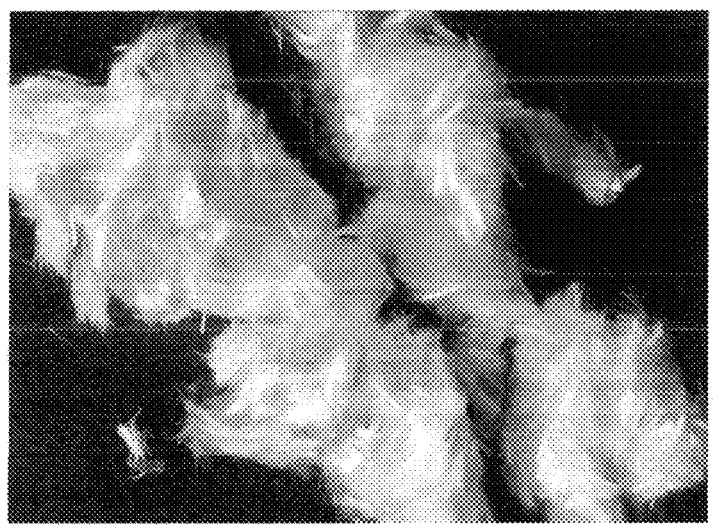

Fig. 3(c): Polypropylene macro-fiber
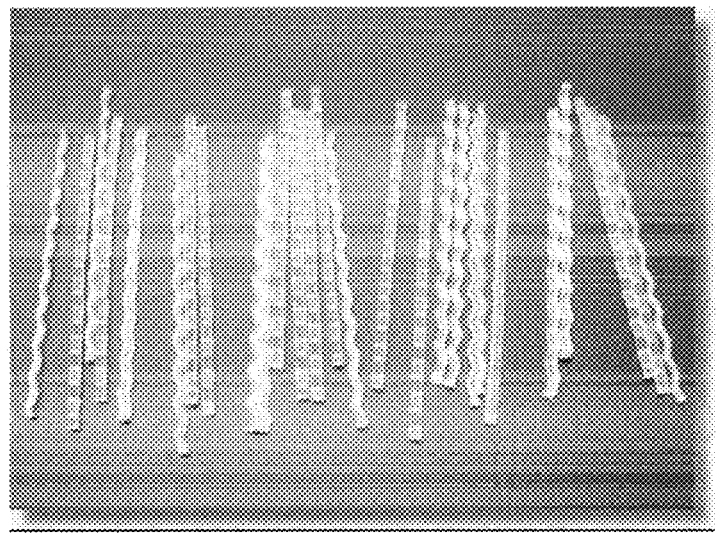
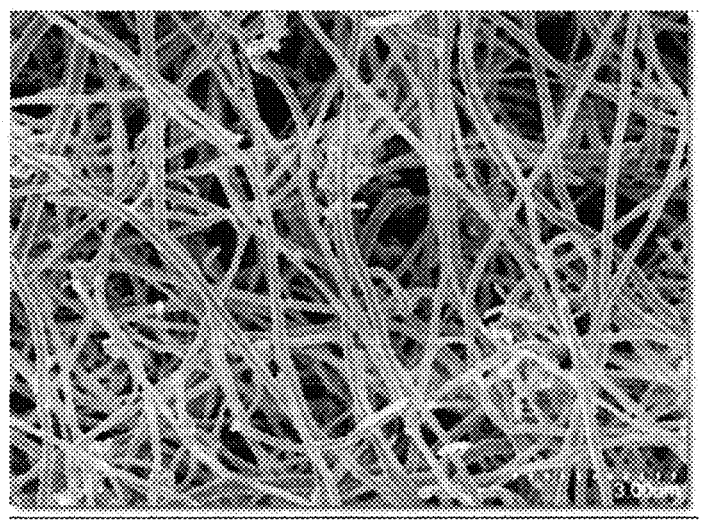
Fig. 4 Graphene nanofibers

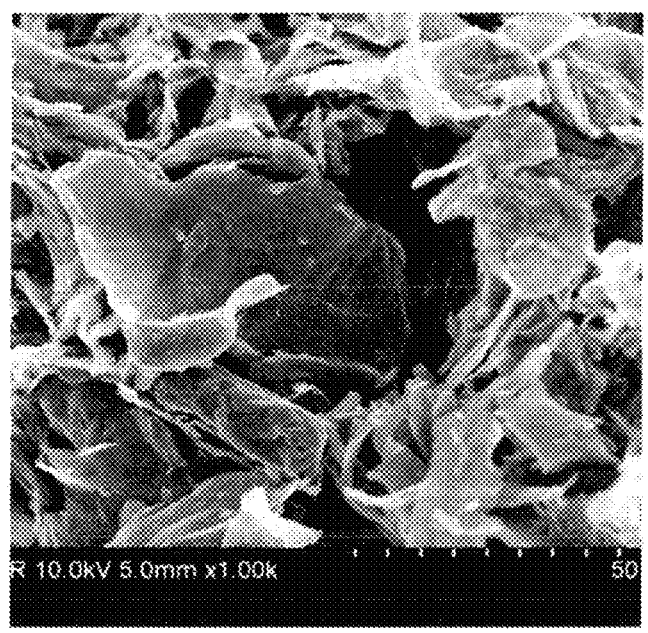
Fig. 5 Graphene nano platelets
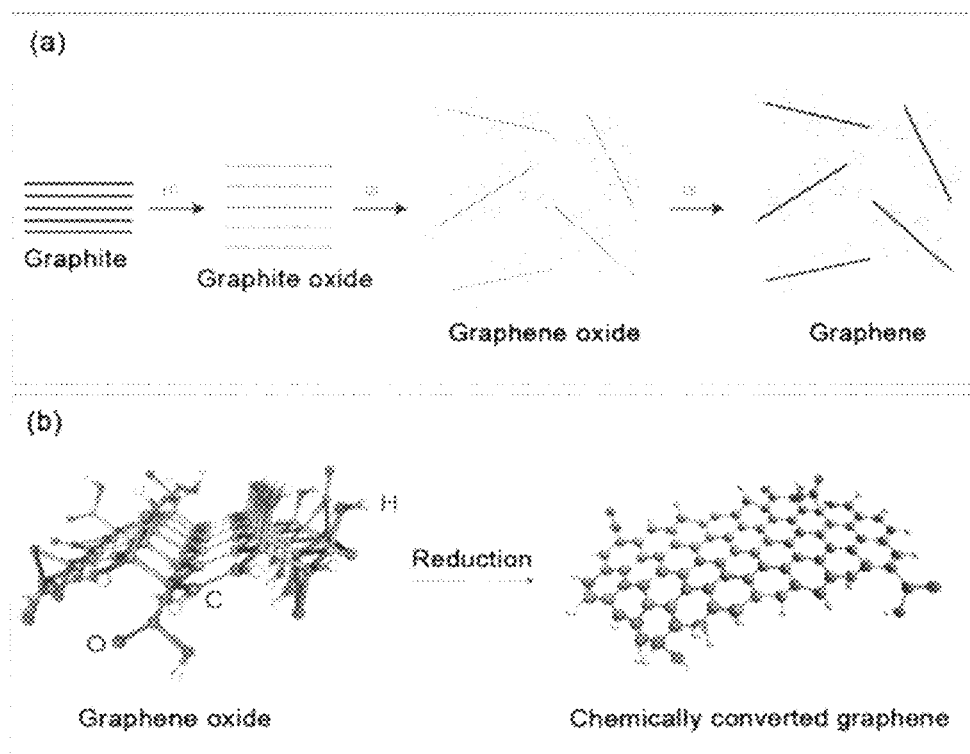
Fig. 6 Graphite, graphene oxide and graphene

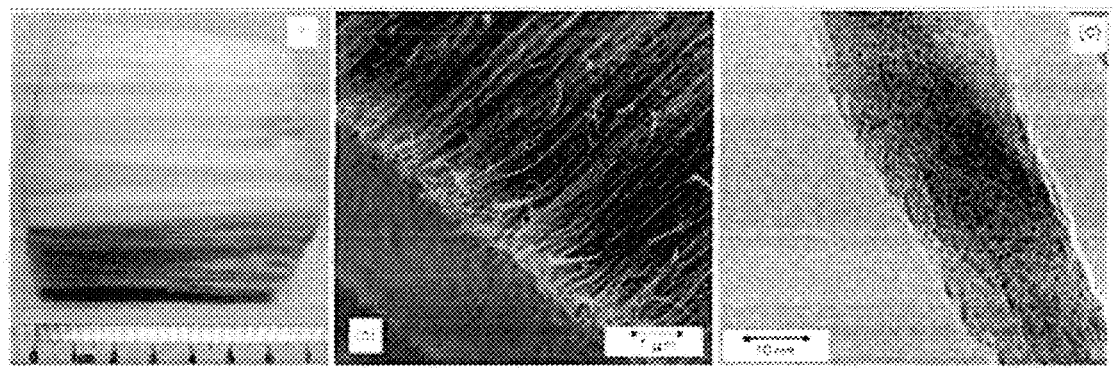
Fig. 7 (a)　　　　　Fig. 7(b)　　　　　Fig. 7(c)
Fig. 7 NAFEN nano aluminum oxide fibers – bulk fibers, Figs. 7 (a) and (b), and individual fiber, Fig. 7(c).
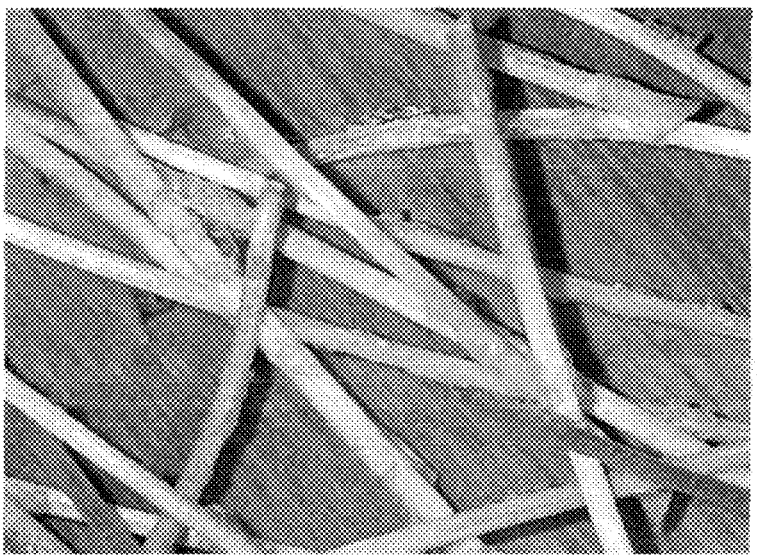
Fig. 8 Texturized fiber produced by the rapid drying of a water insoluble acrylic polymer onto a nylon core multifilament yarn

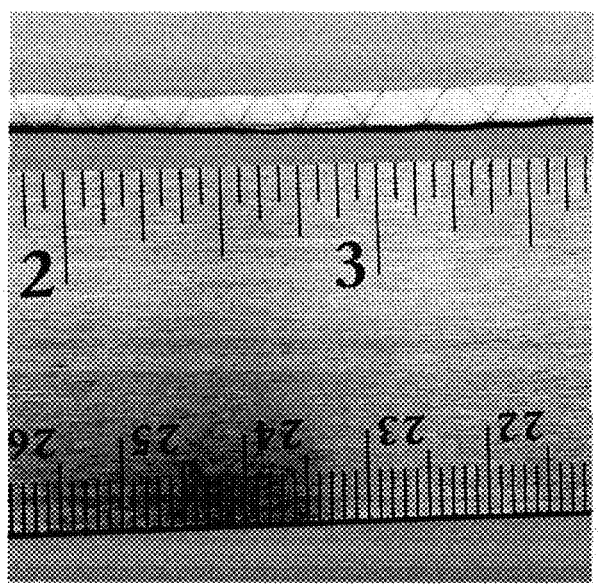
Fig. 9 Multi-filament core yarn overwrapped by a soluble polymer fiber.

COATED FIBERS FOR ENHANCED CONCRETE STRUCTURAL REINFORCEMENT

CROSS-REFERENCE TO RELATED APPLICATIONS

This application claims priority from provisional application Ser. No. 62/707,544, filed Nov. 7, 2017.

FIELD OF THE INVENTION

This application relates to improving the properties of concrete, in particular improving its resistance to corrosion, impact or explosion, by incorporating surface modified fibrous materials, specifically, coated fibrous materials.

BACKGROUND OF THE INVENTION

Prior work in this area includes U.S. Pat. Nos. 7,285,167, 7,396,403 and 7,341,627, all to Ogden and relating primarily to incorporation of carbon fibers (shown in FIG. 1) in concrete, and Ogden application Ser. No. 12/224,084 (now abandoned) also relating to incorporation of "texturized" fibers of carbon, glass, nylon, Kevlar, and polyvinyl alcohol. See para. [0009]. Ser. No. 12/224,084 teaches texturizing the nylon fibers by. e.g., blowing air into the side of a twisted fiber to expand its cross-section prior to the application of a thermoplastic or thermosetting resin coating, thereby allowing the coating to penetrate into the fiber. See para. [0024]. A number of possible resins are listed at para. [0025]. However, Ogden does not appear to appreciate the distinction between alkali-resistant and alkali-insoluble coatings for the fiber; as discussed below, this is an important aspect of the present invention. Ser. No. 12/224,084 claims that a chemical bond is formed between the fibers and cement by virtue of the presence of the resin. See para. [0100]. Testing by the present inventor of fibers treated in this manner has demonstrated that this approach to texturizing the fiber reduces its overall strength when added to a cement/concrete mixture. It is to be noted that Ogden teaches employment of silica fume as a concrete additive, which can be classed as a nanoparticle according to the usual terminology of the art. However, improvements in the use of such nanoparticles are disclosed and claimed herein.

Forta Corporation has a number of patents relating to fiber reinforcement of concrete. These include U.S. Pat. Nos. 8,114,514 and 8,142,889 to MacDonald et al, and U.S. Pat. Nos. 6,753,081, 7,168,232 and 9,321,686 to Lovett et al. The last of these appears to be based on the earlier work and appears to be the most relevant. The teaching relates to providing a coating on fibers, such as polymer or other fibers (see para. [0020] of published application 2014/0275350, on which U.S. Pat. No. 9,321,686 issued) for concrete reinforcement in which the coating is formed by chemical grafting, which is required to coat a polymer such as polypropylene. This is described (see para. [0034] as being performed by first depositing a graft initiator and then a monomer or pre-polymer coating. These coatings then provide improved adhesion to the concrete. See para. [0038].

SUMMARY OF THE INVENTION

The present invention represents further improvements on the Ogden and Forta work discussed above. There are two primary aspects of the invention, which can be used separately or together.

In a first aspect of the invention, polyamide or similar polymeric fibers, aramid fibers, carbon fibers, etc. are coated with alkali-resistant coatings that are either thermochemically or structurally modified (through additives) to increase the surface area and/or surface roughness of the fiber. This facilitates the production of reliable mechanical and chemical bonding between the fibers and the alkali cement matrix. The fibers impart flexural strength to concrete, increasing its strength against conventional loads, impact or blast.

In a second aspect of the invention, the same class of fibers may be used, but with an alkali-soluble coating. The alkali-soluble coating may be used exclusively, or can be applied over an alkali-resistant coating. The alkali-soluble coating, typically applied in liquid form, is modified with additives such as nanoparticles (fibers, graphenes, and others) and then dried by thermal or UV light application. The coating is applied to the fibers in amounts such that it contains the additives (nanoparticles, etc.) at high concentrations. Upon mixing the fibers in a wet concrete mix, the high alkali content of the concrete causes the alkali-soluble coating to dissolve, which assists in dispersing the nanoparticles evenly throughout the cement/concrete matrix. In this way the strength-enhancing nano-particles or other additives are rapidly and uniformly distributed throughout the cement/concrete matrix while also distributing fiber reinforcement for shrinkage control and/or strength enhancement.

BRIEF DESCRIPTION OF THE DRAWINGS

The invention will be better understood if reference is made to the accompanying drawings, in which:

FIG. 1 is a photograph of a carbon fiber produced under the Ogden Patent showing a mechanically texturized surface.

FIG. 2 is a chart showing the relationship between particle size and surface area of various particulate additives for concrete;

FIG. 3, comprising FIGS. 3(a)-(c), includes photographs of three common structural reinforcing fibers for concrete;

FIG. 4 shows a photomicrograph of one type of carbon nanofiber;

FIG. 5 shows a photomicrograph of carbon nanoplatelets;

FIG. 6, comprising FIGS. 6(a) and (b) illustrates the molecular structure of graphite (FIG. 6(a)), graphene oxide and graphene (FIG. 6(b));

FIG. 7, comprising FIGS. 7(a)-(c), shows photomicrographs of NAFEN aluminum oxide nanofibers;

FIG. 8 shows photomicrographs of texturized fibers produced by rapid drying of water-insoluble acrylic polymer onto a nylon core multifilament yarn; and FIG. 9 shows a multi-filament core yarn overwrapped by a soluble polymer fiber.

DETAILED DESCRIPTION OF THE PREFERRED EMBODIMENTS

Advanced concrete formulas have been developed that utilize a range of different sized additives (macro, micro, nano) to fill voids in the cement. Nanoparticles, in particular, have shown great promise as a strength enhancer in cements (as to both compressive and flexural strength), as well as a chemical resistance enhancer (e.g., prevention of the alkali-silica reaction (ASR), known to weaken concrete. These additives can also be designed into a cement matrix to enhance thermal properties, increase wear resistance, increase corrosion resistance, provide electrical conductivity, increase bacterial resistance and more. These properties are to a degree functions of both the size and surface area of the concrete constituents. FIG. 2, which is from Sobolev, K., Shah, S. Nanotechnology in Construction, Proceedings of NICOM 5, Springer, 2015, shows the relation between size and surface area of common concrete constituents.

The Problem

Advanced concrete formulations for high strength and ultra-high strength structural applications have become required in the construction industry for high-rise construction, bridges, tunnels, mining/drilling applications, among others, and as well as for enhanced safety needs, e.g., to resist extreme weather, explosions, high velocity impact, and the like.

Today, these high strength concrete products are made through the use of expensive additives (such as fumed silica or metakaolin), a wide range of liquid chemical additives (such as superplasticizers, water reducers, air entrainment agents, etc., as discussed below) or high density use of steel mesh and/or rebar or steel fibers. These ferrous additives create issues with corrosion of steel members in the concrete and the resulting failure of the concrete structure over time.

Polymeric fibers for admixture to concrete products have evolved over the past 30 years and serve mainly as an additive that will limit or prevent early stage shrinkage cracking. More recent macro-fiber developments have been used to replace welded wire mesh, typically used in lower strength concrete applications.

The majority of fibers used for concrete are polymeric, typically polypropylene. Steel fibers have been used for high strength applications, and come in the form of staples or corrugated shapes. Typical fiber types are shown in FIG. 3. Neither polypropylene nor steel fibers react chemically with cement paste to form a bond with the matrix. These fiber additives offer only mechanical interlock in the case of steel fibers, and virtually no mechanical bond for most shrinkage reduction fiber types. Polymer macro-fibers, typically 1.5-2 inches in length, are often flat or corrugated to increase their surface area in contact with the concrete matrix. However, this again provides only a mechanical interlock, not a chemical bond between the concrete of the matrix and the fiber.

In order to enhance the capabilities of polymer fibers, advancements are needed to form chemical bonds between the fibers and the cement matrix. Accordingly, identification of fibers which when appropriately prepared will bond chemically to the concrete is one object of the invention.

While nanoparticles have shown significant benefits for enhancing cement and concrete strength, they also offer challenges for their successful use. Due to the extremely small size of nanoparticles and their methods of production (in liquid or gas phase), these materials are typically agglomerated due to Van der Wals forces, and therefore tend not to disperse uniformly through the concrete mixture when simply added to the mix of concrete constituents. Individually, nanoparticles offer significant strengths and other properties, yet separating them from each other for bulk use is an extremely challenging task. This is particularly true when it is desired to disperse the nanoparticles throughout a highly viscous material system full of solid particles, such as cement/concrete. Absent substantially uniform dispersion throughout the mix, in actual use these nanoparticles do not provide the beneficial effects found in small-scale laboratory testing. The silica fume disclosed by Ogden is considered a nanoparticle, and when used as a concrete additive, suffers from the problem of agglomeration and failure to disperse through the concrete mix as discussed above. More particularly, silica fume, comprising spherical particles varying in size from 150 nanometers to ~1000 nanometers, is currently the nanoparticle most widely used used in concrete. It functions primarily as a densifier, filling micropores in cement paste. However, the percentage of silica fume required is high, and its cost limits its use in many applications.

Laboratory studies have shown as much as a 20% increase in the strength of concrete using only a fraction of a percent of fiber-like nanoparticles. Carbon nano-tubes, alumina nano-fibers and graphene nano-particles have all demonstrated strength enhancement in cement and concrete. They range in size from 10 s to 100 s of nanometers in length with diameters ranging from 10-20 nanometers. As in the case of nanoparticles, the major issue with using nano-fibers in concrete is ensuring their efficient dispersion. Currently, the dispersion of these materials is typically done by the use of very powerful ultrasonic energy to deagglomerate the particles to their base form. Only then do they offer their highest value as a strength enhancing additive.

While this ultrasonic separation process is acceptable in laboratory testing, the real-world applications of concrete are measured in tons, with a single cubic yard of concrete weighing ~2.0 tons. Accordingly, the use of ultrasonic energy to deagglomerate the nanoparticles is not cost effective for large scale field application of concrete. Despite major advancements, concrete delivery for most on-site applications is still accomplished by a large rotating drum on a truck that mixes the cement, sand, stone and other components using rotational shear mixing. This process has not changed much since its initial invention in 1916. The shear energy in typical concrete equipment is insufficient to efficiently blend nano-fibers. In order for nanoparticles to be fully utilized in industrial concrete applications, new processes to ensure their effective dispersion throughout the concrete mix must be developed.

The Approach

The proposed approach to this problem provided according to the invention is two-fold. First, fibers beneficial to structural enhancement of concrete will be enhanced by developing surface chemistries that will bond both to the fiber and the cementitious matrix. These coatings would need to remain on the fibers after curing of the concrete and therefore must be alkali-insoluble.

Second, concrete reinforcing fibers will be modified with alkali-soluble coatings filled with nanoparticles. The coated fibers will readily mix in conventional cement mixing equipment, avoiding the agglomeration problem. As they do so, their coatings will dissolve so that the nanoparticles are dispersed throughout the entire cement matrix as the fibers are mixed with the other concrete constituents. The quantities of fibers and nanoparticles involved, e.g., ~10 lbs of macro-fiber provided with an adhesive coating and no more than 1 lb of nanoparticles for a cubic yard of concrete containing 500-700 lbs of cement, are processed such that ultrasonic energy can be applied during the mixing of the nanoparticles with the liquid forming the coating on the fibers to avoid agglomeration, allowing the fibers coated with a nanoparticle-filled coating to be subsequently added to the concrete mix in an economic manner. Furthermore, the processes can be combined by performing a "double dip" process in which the first coating is alkali-insoluble, and the second, nanoparticle-filled coating is alkali-soluble. In this way the benefits of both chemical adhesion of the fibers to the concrete and uniform dispersion of the nanoparticles can be realized.

The Key Benefits

Currently in the concrete/cement/grout industry, various strengthening additives are sold as individual additives. This is the case for solids and liquids. In developed areas, most liquid additives are delivered to bulk ready mix plants in tank trucks. They are added through computerized systems that deliver precise quantities per batch. In third world markets, in emergency and rapid response markets (military and civilian) access to heavy liquid tanks and totes, as well as pallets of powdered additives may not always be easy or practical. However, fiber additives are lightweight and easily packaged in water soluble packaging. They can be dosed at the job site. According to the process taught in this patent application, a wide range of additives, both liquid and solid additives can now be delivered as a coating on a wide range of commercial fibers, including new fibers developed as part of this invention, as well as existing commercial fiber products.

Materials to be Employed

Core Fiber

The core fibers that comprise the base for the invention can be made from a wide range of polymers, including but not limited to polypropylene, polyethylene, polylactic acid (PLA), polyimide, etc. In addition, higher strength fibers such as aramid, HDPE, carbon, basalt and steel can serve as the core fiber. The fibers can each comprise a plurality of filaments rather than a monofilament, as multiple filaments bundled together tend to fail less radically when they break. Bundles of fiber, each fiber comprising numerous individual filaments of very fine diameter (tens of microns in diameter), can comprise thousands of filaments per bundle. In addition, the bundles can be plied together either with a twist configuration or parallel in conjunction with a coating that can bond them together.

Coatings

1. Alkali-Insoluble Chemical Coatings for Enhanced Bonding of Polymer Fibers to Portland Cement The most commonly used adhesives for bonding components to concrete are: acrylics, styrene-acrylics, ethylene vinyl acetate (EVA), polyvinyl acetate (PVA), epoxy compounds and styrene-butadiene resin (SBR). In liquid form these typically are supplied in two parts, liquid and powder, to be mixed together. In dry form they are prepackaged materials blended for specific applications. Whether in liquid or dry form, each polymer has strengths and weaknesses and recommended uses, as follows.

Acrylic polymers have the best water vapor transmission rates (breathability) of all the polymers. Styrene acrylics are very similar to acrylics in their performance with improved water resistance but have less UV stability.

Vinyl acetate ethylene (VAE) can be packaged either wet or dry and is the most-used polymer for prepackaged products.

Styrene-butadiene copolymer resin (SBR) has the best adhesion to concrete of all the polymers mentioned, the best resistance to water, and the best abrasion resistance. It is also most cost-effective for thick overlays. However, SBR polymers have poor UV stability.

Epoxies are single or bi-component resin systems that provide very high strength bonds to most polymer fiber systems while also reacting with calcium oxide in cement paste to form highly flexible concrete materials. Polyvinyl acetate (PVA) is the least expensive and the most re-wettable of the group. However, it is subject to hydrolysis in wet alkaline environments causing breakdown of the polymer.

As described in the following section, these types of coatings can be applied through accelerated thermal curing processes for rapid, low cost production. In these processes, the coated fibers can be heat-treated to provide a roughened or textured surfaces, further improving adhesion to the cement of the concrete mixture.

Coating Examples

Latex acrylic coatings and thermoset one-part epoxies were tested. The coatings tested come as room temperature water-based liquids. These liquids have a solids content ranging from 40-60% and can be diluted if reduced viscosity is desired for penetration into twisted fiber bundles. Fibers were immersed in the liquid and rolled under tension through a liquid-containing trough. The fibers were then immediately heated by passing them through an oven. The oven length and temperature are designed to insure the complete drying of the coating by the time the fiber exits the oven and is wound onto a tube for subsequent chopping to a desired length. Some coating materials have been modified to react by ultraviolet curing.

2. Alkali-Soluble Coatings to Act as Liquid Admixtures and/or to Carry Nanoparticles Throughout the Concrete Mix Various alkali-soluble admixtures for concrete are commercially available in liquid form. Most of these additives are sold diluted with water to aid in their ease of mixing in wet concrete. They can also be reduced to a solid and applied as a coating to a substrate, in this case, to the fibers.

Table 1, below, lists various known alkali-soluble substances used to modify the properties of concrete in various useful ways, also listed.

TABLE 1

From Design and Control of Concrete Mixtures, Portland Cement Association, 2016

| Type of admixture | Desired effect | Material |
| --- | --- | --- |
| Accelerators (ASTM C 494 and AASHTO M 194, Type C) | Accelerate setting and early-strength development | Calcium chloride (ASTM D 98 and AASHTO M 144) Triethanolamine, sodium thiocyanate, calcium formate, calcium nitrite, calcium nitrate |
| Air detrainers | Decrease air content | Tributyl phosphate, dibutyl phthalate, octyl alcohol, water-insoluble esters of carbonic and boric acid, silicones |
| Air-entraining admixtures (ASTM C 260 and AASHTO M 154) | Improve durability in freeze-thaw, deicer, sulfate, and alkali-reactive environments Improve workability | Salts of wood resins (Vinsol resin), some synthetic detergents, salts of sulfonated lignin, salts of petroleum acids, salts of proteinaceous material, fatty and resinous acids and their salts, alkylbenzene sulfonates, salts of sulfonated hydrocarbons |
| Alkali-aggregate reactivity inhibitors | Reduce alkali-aggregate reactivity expansion | Barium salts, lithium nitrate, lithium carbonate, lithium hydroxide |
| Antiwashout admixtures | Cohesive concrete for underwater placements | Cellulose, acrylic polymer |

TABLE 1-continued

From Design and Control of Concrete Mixtures, Portland Cement Association, 2016

| Type of admixture | Desired effect | Material |
|---|---|---|
| Bonding admixtures | Increase bond strength | Polyvinyl chloride, polyvinyl acetate, acrylics, butadiene-styrene copolymers |
| Coloring admixtures (ASTM C 979) | Colored concrete | Modified carbon black, iron oxide, phthalocyanine, umber, chromium oxide, titanium oxide, cobalt blue |
| Corrosion inhibitors | Reduce steel corrosion activity in a chloride-laden environment | Calcium nitrite, sodium nitrite, sodium benzoate, certain phosphates or fluosilicates, fluoaluminates, ester amines |
| Dampproofing admixtures | Retard moisture penetration into dry concrete | Soaps of calcium or ammonium stearate or oleate<br>Butyl stearate<br>Petroleum products |
| Foaming agents | Produce lightweight, foamed concrete with low density | Cationic and anionic surfactants<br>Hydrolized protein |
| Fungicides, germicides, and insecticides | Inhibit or control bacterial and fungal growth | Polyhalogenated phenols<br>Dieldrin emulsions<br>Copper compounds |
| Gas formers | Cause expansion before setting | Aluminum powder |
| Grouting admixtures | Adjust grout properties for specific applications | See Air-entraining admixtures, Accelerators, Retarders, and Water reducers |
| Hydration control admixtures | Suspend and reactivate cement hydration with stabilizer and activator | Carboxylic acids<br>Phosphorus-containing organic acid salts |
| Permeability reducers | Decrease permeability | Latex<br>Calcium stearate |
| Pumping aids | Improve pumpability | Organic and synthetic polymers<br>Organic flocculents<br>Organic emulsions of paraffin, coal tar, asphalt, acrylics<br>Bentonite and pyrogenic silicas<br>Hydrated lime (ASTM C 141) |
| Retarders (ASTM C 494 and AASHTO M 194, Type B) | Retard setting time | Lignin<br>Borax<br>Sugars<br>Tartaric acid and salts |
| Shrinkage reducers | Reduce drying shrinkage | Polyoxyalkylene alkyl ether<br>Propylene glycol |
| Superplasticizers* (ASTM C 1017, Type 1) | Increase flowability of concrete<br>Reduce water-cement ratio | Sulfonated melamine formaldehyde condensates<br>Sulfonated naphthalene formaldehyde condensates<br>Lignosulfonates<br>Polycarboxylates |

In addition to these additives, other alkali-soluble polymers from the paper industry, such as Acrysol or cellulosic polymers, can be used to coat the fibers.

Testing carried out to evaluate the utility of the fibers provided according to the invention was focussed on their solubility when placed in a wet concrete mixture and blended during shear mixing, such as the coated fiber would experience in a full-sized transit truck as conventionally used to blend and deliver concrete. This testing was done at laboratory-scale using well-documented mixing equipment.

Typical test steps were as follows:
1. Uncoated fiber weight determined.
2. Fiber coated and dried
3. Coated and dried fiber weight determined.
4. Fiber mixed in cement/concrete
5. Fiber removed from the cement, rinsed at a neutral pH, dried and reweighed.

More specifically, as to step 5, the fiber was extracted from wet cement by extracting a portion of the cement-fiber blend and placing it on a shaker sieve. The sieve was washed with water (neutral pH) so as to avoid dissolution of the alkali-soluble coating. The washed fiber was dried and weighed. The resulting weight, when compared to the initial weight of the coated fiber, indicates the percentage of the coating that has remained on the fiber, and conversely, the percentage of the coating that has been dissolved into the concrete mix. If a known amount of nanoparticles has been added to the coating, this number will show the effectiveness of removal of nanoparticles from the fiber and their effective dispersion throughout the cement paste matrix.

Accordingly, this testing shows the efficiency of coating dissolution that takes place; that is, the difference in weight of the fibers after removal will indicate the degree to which the coating and nanoparticles therein has been effectively transferred to the concrete.

Nanoparticle Additives

The following lists various nanoparticles that may find use with the process of the invention.

Carbon nanotubes—A carbon nanotube (CNT) is a tube-shaped member, made of carbon, having a diameter measuring on the nanometer scale. A nanometer is one-billionth of a meter, or about 10,000 times smaller than a human hair. CNTs are unique because the bonding between the atoms is very strong and the tubes can have extreme aspect ratios.

Graphene—Graphene is an allotrope of carbon in the form of a two-dimensional, atomic-scale, hexagonal lattice in which one atom forms each vertex. It is the basic structural element of other allotropes, including graphite, charcoal, carbon nanotubes and fullerenes. It can be considered as an indefinitely large aromatic molecule, the ultimate case of the family of flat polycyclic aromatic hydrocarbons.

A range of commercially-available nanoparticles and graphene materials were evaluated. These included:

Functionalized nano-carbon tubes

Pyrograf®-III is a very fine, highly graphitic, low cost, tubular carbon nanofiber available from Pyrograf Products, Inc. Pyrograf®-III is available in two types of fiber with diameters ranging from 70-200 nanometers and a length of the as-produced fiber estimated to be 50-200 microns. Therefore, these nanofibers are much smaller in diameter than conventional continuous or milled carbon fibers (5-10 microns) but significantly larger than carbon nanotubes (1-10 nanometers). Pyrograf®-III nanofiber is currently offered in two types and in the three grades shown below. FIG. 4 shows a photomicrograph of one type of this nanofiber.

Pyrograf III nano carbon fiber are available in several types, as follows:

PS Pyrolytically stripped carbon nanofiber, that is, where polyaromatic hydrocarbons have been removed from fiber surface.

LHT Carbon nanofiber heat-treated to temperatures of 1500° C., which carbonizes chemically vapor deposited carbon present on the surface of the nanofibers. This heat treatment produces nanofibers which generally provide the highest electrical conductivity in nanocomposites.

HHT Carbon nanofiber heat-treated to temperatures up to 3000° C., which graphitizes chemically vapor deposited carbon present on the surface of the carbon nanotubes. This high heat treatment creates the most graphitic carbon nanofiber and reduces the iron catalyst content to very low levels.

Other forms of single or double walled carbon nano-tubes are considered within the scope of the invention.

Graphene

Graphene and graphene oxide are available from Angstrom Materials. FIG. 5 shows a photomicrograph of graphene platelets. Graphene is one of the strongest materials known to exist. Due to the C—C bonds that make up graphene, it possesses amazing tensile strength. In its pristine form, graphene is at least an order of magnitude stronger than steel and Kevlar, for example. Graphene oxide offers very similar properties as graphene, but is much easier to separate into individual sheets. The chemical structures for these products are shown in FIG. 6.

As manufacturers of graphene and graphene oxide continue to produce new forms of these materials, their use would be anticipated to be useful in practice of the invention.

Alumina Nanofibers

Alumina nanofibers consist of either aluminum oxide (Al2O3) or one of several aluminum hydroxides, such as aluminum oxide hydroxide (AlOOH), commonly referred to as boehmite, or aluminum trihyroxide [Al(OH)3], commonly referred to as gibbsite, bayerite or nordstrandite.

An example is NAFEN Dynamic Enhancers, based on ANF Technology's NAFEN alumina nanofibers. These are produced in coaligned fiber blocks (having fiber diameters of 10-20 nm) in a production process which is scalable to meet the production needs of typical industrial customers. The material boasts an active surface area of more than 150 m$^2$/g, tensile strength of 12 GPa and tensile modulus of over 400 GPa. The surface is faceted with vacant aluminum bonds, which provide NAFEN with mechanical bonding strength. NAFEN fibers are resistant to fire, chemicals and radiation, and maintain their gamma phase crystal structure at temperatures up to 1200 C. FIG. 7 shows photomicrographs of these fibers, which would likely be useful in the process of the invention.

Iron Nanofibers—

Iron nanofibers can be rapidly produced by the decomposition of iron pentacarbonyl in an inert atmosphere with an applied magnetic field. The individual clusters of iron atoms coalesce in a fiber shape due to the directional forces imposed by the magnetic field. The product can be made virtually void- and defect-free and can achieve near-theoretical strengths.

Nano Titanium Oxide—

Nano titanium dioxide is divided into two crystal forms, known as rutile and anatase. Anatase has high purity, an average particle size of less than 100 nm, great transparency and excellent UV absorption. It also has great thermal and chemical stability.

The anatase crystal form is used for production of photo-catalysts. As a concrete surface layer and under solar or other UV illumination, it can help break down hazardous gases and organic pollutants via photo-catalysis.

Nano-Clays (Silicates, Aluminates)

Nano-clays have demonstrated effective strength gain through their ability to close off nano-porosity coupled to their ability to locally bond to the calcium aluminosilicate hydrate formed in the cement paste.

Nano-Insulation Materials (Nano Aerogels, etc.)—

The application of superinsulation materials (SIM) to concrete can attain thermal conductivities far below 20 mW/(mK) and can allow the construction of relatively thin building envelopes while still maintaining a high thermal resistance. This can be achieved through the use of hollow silica nanospheres as well as the incorporation of aerogels.

Testing has been performed to demonstrate the properties of the concrete that are most improved based on the specific nanoparticle and the amount of that particle dispersed in the cement/concrete.

Testing

Production of Surface Modified Coatings

Example 1

An acrylic emulsion was incorporated into and onto a fiber braid of 3 plies of nylon (nylon 6 and nylon 66 both having been tested) maid, by dipping the fiber braid into a bath of the acrylic emulsion followed by passage through a die. Each braid consisted of a multiplicity of fine nylon fibers, each comprising a large number of filaments. The coated fibers were heated to 200-350° F. to remove the water from the emulsion and adhere the acrylic polymer to the fiber. In addition, the temperature range was controlled to induce a degree of rapid boiling of the coating, producing a roughened or "textured" surface, shown in FIG. 8.

The resulting fiber was cut to lengths of 2 and 2.5 inches. The fibers were subsequently placed in a concrete mix using the basic ingredients of type I Portland cement, construction grade (C33) sand and coarse aggregate. The fiber was added at levels of 10 lbs/cubic yard. The concrete was cast and cured according to ASTM C94 curing standards. Casting samples included 4 inch diameter×8 inch cylinders (for compression testing) and 4×4×20 inch beams (for flexural strength testing).

Example 2

In a second example, the fiber was treated identically and the concrete prepared identically. However, in this example the fiber was added at levels of 25 lbs/cubic yard.

Table 2, below, shows test results. As indicated by the 7D, 28 D and 56 D column headers, the samples were tested at intervals of 7, 28, and 56 days per ASTM test methods. In addition, the flexural test was extended to measure residual strength. To do this, the concrete beam was tested until it failed. Then, the same beam is retested to measure the residual strength that can be carried by the fibers. This is then repeated a third time.

In Table 2, the Base formula is the concrete formula used throughout the test with no fiber addition. The Nylon 6, 2-inch textured sample is the product shown in FIG. 8. These fibers were made by running the base Nylon 6 fiber through a bath of acrylic resin (60% solids), run through a die to wipe off excess acrylic and then rapidly dried at temperatures between 250 and 350 F to cause rapid boiling of the water from the acrylic emulsion and forming the roughened/textured surface. The Nylon 66, 2.5 inch textured sample is also similar in surface to FIG. 8 and produced in the same manner as the previous Nylon 6 textured fiber.

The Nylon 66 3-inch smooth and Nylon 66 2-inch smooth fiber represents a fiber made under the Ogden technology (Ogden application Ser. No. 12/224,084, now abandoned). These fibers have the same acrylic coating used in the textured fibers of this test, but were wiped of all excess acrylic coating and generated no surface roughness in the acrylic cure process.

The data from Table 2 shows that the Nylon 6 and 66 textured fiber products exhibited the best overall tensile strengths at 7, 28 and 56 days.

It is easy to see that this quantity of fibers—and noting that the tensile strength of the fibers is significantly higher than of base concrete with no fibers—could readily make a real improvement in strengthening the concrete against a blast or impact, especially with the improved chemical adhesion according to the invention. Without limiting the invention to any particular theory of operation, it is believed that the presence of the fibers allows the concrete to "bend but not break" in response to blast or impact.

Nanoparticle Dispersion Testing

Another aspect of the coated fiber technology put forth in this patent application is the ability to apply coatings to the fibers that either enhance the strength of the bond between the fibers and the concrete, or enhance the strength of the concrete by being dissolved off the fibers in the highly alkali environment produced in wet cement/concrete, so as to disperse commercially available soluble additives to enhance the properties of the concrete, and/or to disperse otherwise agglomerative nano-particles throughout the cement/concrete. Depending on the properties desired, the nano-particles can range from carbon nanotubes enhancing the mechanical properties of the concrete, anti-bacterial nano-titanium dioxide or molybdenum, and other nanoparticles, providing corresponding benefits.

TABLE 2

| SAMPLE ID | COMPRESSIVE STRENGTH (PSI) | | | TENSILE STRENGTH (PSI) | | |
|---|---|---|---|---|---|---|
| | 7 DAYS | 28 DAYS | 56 DAYS | 7 DAYS | 28 DAYS | 56 DAYS |
| BASE FORMULA - NO FIBERS | 6191 | 7232 | 7771 | 1191 | 1054 | 1027 |
| NYLON 6 - 2 inch textured. | 5687 | 6338 | 6928 | 1179 | 1284 | 1321 |
| NYLON 66 - 2.5 inch textured | 6058 | 6875 | 7221 | 1276 | 1398 | 1467 |
| NYLON 66 3 INCH SMOOTH | 5310 | 6008 | 6596 | 922 | 1032 | 1243 |
| NYLON 66 2 INCH SMOOTH | 4717 | 5914 | 6020 | 1057 | 1116 | 1207 |

| RESIDUAL TENSILE STRENGTH (MULTIPLE FLEXURAL TESTS AFTER INITIAL FAILURE) | | | | | | | | | |
|---|---|---|---|---|---|---|---|---|---|
| | 7 DAYS | | | 28 DAYS | | | 56 DAYS | | |
| | 1st test | 2nd test | 3rd test | 1st test | 2nd test | 3rd test | 1st test | 2nd test | 3rd test |
| BASE FORMULA - NO FIBERS | 1191 | none | none | 1064 | none | none | 1027 | none | none |
| NYLON 6 - 2 inch textured. | 1179 | 489 | 483 | 1284 | 380 | 250 | 1321 | 431 | 366 |
| NYLON 66 2.5 inch textured. | 1276 | 664 | 632 | 1398 | 723 | 689 | 1467 | 747 | 743 |
| NYLON 66 3 INCH SMOOTH | 922 | 219 | 214 | 1032 | 325 | 206 | 1243 | 387 | 272 |
| NYLON 66 2 INCH SMOOTH | 1057 | 194 | 261 | 1116 | 322 | 230 | 1207 | 293 | 217 |

Current industry standards for fiber additions in concrete range from 1-10 pounds per cubic yard. One pound of the fiber employed in the examples above consists of ~15,000 fibers. A cubic yard of concrete is 27 cubic feet. Therefore when 25 pounds of fiber are dispersed there are ~0.9 lbs of fibers per cubic foot of concrete, or ~13,500 fibers per cubic foot. This equates to 13,500 fibers per 1,700 cubic inches, or more than 8 fibers per cubic inch. Of course if the fibers are 2-3" long they would normally extend over several cubic inches, meaning that there would be on the order of 16-20 fibers in each cubic inch of concrete. Additionally, a cubic yard of concrete typically comprises 15% cement "paste" by weight, the balance being sand and stone. The fibers cannot occupy the volume of the concrete comprised of stone or sand, but only the cement paste. Therefore, the concentration of the fibers actually in the "glue" that holds the concrete together is much higher.

In laboratory testing the nanoparticles can be dispersed in a high viscosity liquid polymer for later application to the fibers by high energy ultrasonic energy or using a high shear stationary mixer. In a third possibility, the nanoparticles can be placed in an extrusion mold and compounded with a polymer into precursor pellets, which would then be melted for application to the fibers. In each case the fibers with the nanoparticles coated thereon would then be added to the concrete mix in a conventional high-shear mixing process. Each of these is expected to avoid the problem of agglomeration of the nanoparticles, so that the nanoparticles are dispersed throughout the concrete, maximizing their utility in improving the characteristics of the concrete.

Example 1

In a first set of tests, reported in Table 3 below, base line test samples without fibers or CNTs were first made and tested. Next, samples of concrete with acrylic coated fiber prepared as described above, that is, with an acrylic coating only, were prepared and tested. Finally, samples including CNTs in varying amounts as listed were simply mixed with a liquid additive and mixed with the concrete mixture. In each test the liquid additive used was an alkali-soluble air entrainment agent marketed as Sika® Air-260.

Sika® Air-260 is a synthetically manufactured surfactant for the air entrainment of concrete. Sika® Air-260's patented formula provides control of the air content and finishability in air-entrained concrete. Sika® Air-260 increases concrete's durability, making it more resistant to the damaging effects of freezing and thawing, while improving workability and reducing bleeding. Sika® Air-260 meets the requirements of ASTM C 260. However, it does not increase the strength of the concrete per se.

The CNTs suspended in the air entrainment liquid were applied to the acrylic coated nylon fibers and oven dried at temperatures ranging from 250-350 F.

From this test, it is demonstrated that concrete compressive strength is reduced by the addition of macro-fiber alone. This is to be expected, since fiber strength is typically a flexural strength enhancement. Simply adding low strength polymer fibers to concrete lowers the overall compressive strength.

In subsequent testing, CNTs were mixed with the liquid air entrainment agent and added in varying, but very low percentages to the concrete mix. Tending to be agglomerated, as discussed above, the CNTs have little effect on the overall strength of the concrete. While there is a trend upward with increased CNT content, the mix never reaches the compressive strength of the concrete with zero fiber addition.

TABLE 3

Test matrix for CNTs blended into air entrainment liquid
Compressive strength (psi) of baseline concrete and concrete
with conventional addition of CNTs

| % CNT | CNTs in solution added directly to cement | |
|---|---|---|
| | 7 Day | 28 Day |
| 0 (baseline-no fiber) | 4235 | 5768 |
| 0 (baseline with 7.5% Acrylic Coated macro-fiber alone) | 3990 | 5444 |
| 0.01 CNT | 3928 | 5326 |
| 0.025 CNT | 3968 | 5369 |
| 0.05 CNT | 4025 | 5426 |
| 0.075 CNT | 4108 | 5528 |
| 0.1 CNT | 4155 | 5686 |

In a second set of tests, data from which is reported in Table 4, the CNTs were added to the fibers by first mixing them with an alkali-soluble liquid fiber coating, as described above. The coating was the same air-entrainment product used in the first set of tests, Sika Air 260. In this test, the same percentage of CNTs were applied to the concrete mixture. This was done by first dehydrating a commercial air entrainment mixture, then blending in CNTs and subjecting the mixture to ultrasonic disruption for 5 minutes, to deagglomerate the CNTs. The liquid slurry was then coated onto the same acrylic coated nylon macro-fibers used in the first test, and the CNT-coated fibers added to the concrete mix. It is clearly shown that the compressive strength of these samples improved beyond the baseline concrete using zero fiber reinforcements. At 28 day curing, the CNT added through dissolution from the macro-fiber coating had compressive strengths 16% stronger than that of the baseline concrete.

TABLE 4

Test matrix where CNTs were added to cement via macro-fiber/admixture approach
Compressive strength (psi) of concrete with addition of CNTs
by coating onto fibers

| % CNT | 7 Day | 28 Day |
|---|---|---|
| 0.01 | 4136 | 5465 |
| 0.025 | 4268 | 5626 |
| 0.05 | 4478 | 5878 |
| 0.075 | 4885 | 6226 |
| 0.1 | 5187 | 6482 |

It can be seen by comparison of the data in Table 3 and 4 that addition of the CNTs by proving them as a coating on the fibers provided a substantial improvement in the concrete properties as compared to simply adding the same relative quantities of CNTs to the concrete mix. It is believed that these improved results are found because the CNT's, being provided as a coating on the fibers, are dispersed throughout the concrete mix, avoiding the agglomeration problems that occur when they are simply suspended in the air entrainment liquid.

The specifics of the sample preparation the results of which are reported in Table 4 are as follows: Carbon nano-tubes (CNT) from PyroGraf were blended in alkali soluble liquid admixtures in varying amounts (weight percentages) as shown in Table 4. After blending the solid particles with the liquids using a magnetic stirrer in a beaker, the mix was subsequently agitated using an ultrasonic disrupter horn to deagglomerate the CNTs. After 5 minutes of sonication, 1260 denier by 3-ply twisted nylon 66 fibers (again, having previously been coated with an acrylic layer) were run through the bath air entrainment chemical with the nanofibers suspended therein and then run through a sizing die to wipe off excess coating and allow a uniform coating of the coating/CNT blend to remain on the fibers. The fiber was subsequently dried in an oven and then chopped to a length of 2.5 inches. As mentioned above, the test results shown in Table 4 demonstrate improved material properties.

Example 2

Tables 5 and 6 demonstrate similar results using alumina nanofibers, in Table 5 these being simply mixed with the air entrainment liquid added to the concrete mix, and in Table 6 being applied to fibers to ensure good dispersion throughout the concrete mix. In other respects the tests were generally as described above.

TABLE 5

Test matrix for aluminum oxide nano fibers (Nafen) blended into water
reducing admixture
Compressive strength (psi) of baseline concrete and concrete with
conventional addition of alumina nanofibers (ANF)

| % ANF | 7 Day | 28 Day |
|---|---|---|
| 0 (baseline-no fiber) | 4550 | 5978 |
| 0 (baseline with 7.5% Macro-fiber alone) | 4067 | 5580 |
| 0.01% ANF | 4120 | 5490 |
| 0.025% ANF | 4015 | 5528 |
| 0.05% ANF | 4281 | 5625 |

TABLE 5-continued

Test matrix for aluminum oxide nano fibers (Nafen) blended into water reducing admixture
Compressive strength (psi) of baseline concrete and concrete with conventional addition of alumina nanofibers (ANF)

| % ANF | 7 Day | 28 Day |
|---|---|---|
| 0.075% ANF | 4373 | 5666 |
| 0.1% ANF | 4545 | 5745 |

As can be seen, addition of the ANFs by simply mixing them with the concrete provided little or no improvement of properties.

In a further series of tests, ANFs were added to the concrete mix by being first coated onto the surface of the polymer fibers. Results are shown in Table 6, below. More specifically, aluminum oxide nanofibers sourced from Nafen Technology were blended in alkali-soluble liquid admixtures of the air entrainment chemical in varying amounts as shown in Table 6. After blending the solid particles with the additive liquid using a magnetic stirrer in a beaker, the mix was subsequently agitated using an ultrasonic disrupter horn to deagglomerate the ANFs. After 5 minutes of sonication, 1260 denier by 3-ply twisted nylon 66 fibers prepared as above were run through the bath and then run through a sizing die to wipe off excess coating and allow a uniform coating of the additive/Nafen blend to remain on the fibers. The fiber was subsequently dried in an oven and then chopped to a length of 2.5 inches.

TABLE 6

ANFs added to cement via macro-fiber/admixture approach
Compressive strength (psi) of baseline concrete and concrete with addition of alumina nanofibers (ANFs) by being coated onto fibers

| % CNT | 7 Day | 28 Day |
|---|---|---|
| 0.01 | 4220 | 5577 |
| 0.025 | 4298 | 5698 |
| 0.05 | 4568 | 5790 |
| 0.075 | 4663 | 5935 |
| 0.1 | 4878 | 6161 |

The improved material properties resulting from addition of the ANFs as coating on fibers, rather than simply adding them to the mix, are clearly apparent from comparison of the results for the latter in Table 5 with those for the former in Table 6.

Benefits of this distributed nanofiber approach have been clearly shown through this alkali-soluble coating approach using macro-fibers to carry nanofibers throughout a cement mixture during typical mixing times for concrete. While there were differences between the performance of the CNTs and the nano-aluminum oxide fibers, the key benefit is examined within each data set to show the benefit added by attaching the nano-particles to the larger "carrier fibers" to assist in their dissemination throughout the cement/concrete matrix.

In a further embodiment, any concrete admixture that can be dried as a coating can also be extruded into a shape, such as, but not limited to, fibers. Therefore, these chemicals can also be further modified to carry nano-particles, dried, and subsequently extruded into shapes such as, but not limited to, fibers. These fibers can either be dispersed directly into a cement/concrete mix or used as an overwrap on a yarn of insoluble macro-fiber for enhanced dispersion throughout the cement/concrete mixture. See FIG. 9.

Similar benefits are expected to be attained in mortars, thin sets and other concrete/cement products. Furthermore, the admixture liquid can be extrapolated to any alkali soluble liquid that is typically used in concrete for some other standard benefit such as air entrainment admixtures, corrosion inhibitors, bonding admixtures and other cement/concrete admixtures such as those shown in Table 1.

While several preferred embodiments of the invention have been described in detail, the invention is not to be limited thereby, but only by the following claims.

What is claimed is:

1. A method for improvement of the mechanical and chemical resistant properties of concrete, comprising the steps of:
   preparing a quantity of fibers by texturizing them;
   coating the fibers with an alkali-insoluble liquid polymer which will adhere to the material of the fiber and to concrete;
   coating the fibers with a further coating of nanoparticles disposed in an alkali-soluble material, such that upon subsequent mixing with a concrete mix, the alkali-soluble coating dissolves, leaving the nanoparticles dispersed throughout the concrete mix;
   drying the coated fibers;
   cutting the dried fibers to lengths of 2-3 inches;
   mixing the cut fibers into a wet concrete mix;
   disposing the concrete mix in a final configuration; and
   allowing the concrete to cure.

2. The method of claim 1 wherein the alkali-insoluble liquid polymer is dried so as to form a roughened surface of the dried polymer adhered to a core fiber.

3. The method of claim 1 wherein the polymer-coated fibers are configured as a monofilament or plurality of monofilaments having a denier of at least 1000.

4. The method of claim 1 wherein the fibers are made of materials selected from the group consisting of: acrylic, polyamide, polyolefin, polyester, polyvinyl alcohol, ethyl vinyl acetate, basalt, steel and carbon.

5. The method of claim 1 in which a benefit of fiber incorporation to a cement or concrete matrix is chemical or mechanical.

6. The method of claim 1, wherein the polymer coating applied to the fibers is selected from the group consisting of acrylic, butyl rubber, ethyl vinyl acetate, polyamide, polyester, polyvinylidine and polyvinyl alcohol.

7. The method of claim 5, wherein the polymer coating applied to the fibers also includes alkali-soluble liquid additives used to beneficiate cement and concrete.

8. The method of claim 1 wherein the nanoparticles are selected from the group consisting of single and double walled carbon nanotubes, aluminum oxide nanofibers, nano-sized fly ash, nano-sized silica, and nano-sized graphene and graphene oxide.

9. The method of claim 1, wherein the alkali-insoluble coating is applied through a process of fiber immersion into a liquid bath followed by thermal or UV drying.

10. The method of claim 1, wherein the nanoparticles are entrained into an alkali-soluble polymer and pelletized, the pellets then being melted and applied to the fibers via hot melt cross-head extrusion.

11. The method of claim 1 where the nanoparticles are entrained into an alkali-soluble polymer matrix and extruded into a fiber, and the fiber is then wrapped around a yarn of polymer fibers.

* * * * *